May 8, 1951 — C. P. BAUM — 2,551,577
COUPLING
Filed Feb. 13, 1946
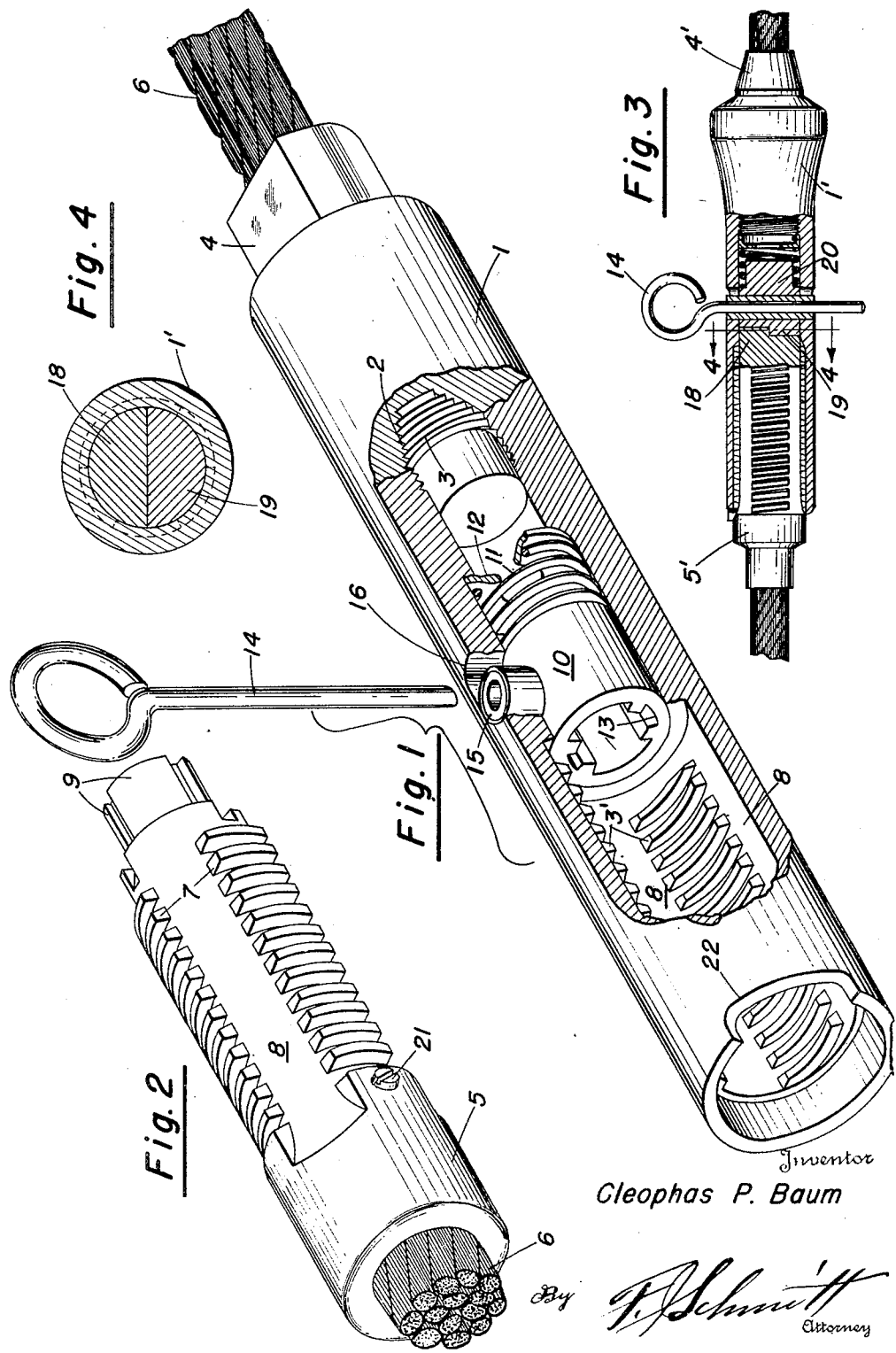
Inventor
Cleophas P. Baum Patented May 8, 1951

2,551,577

UNITED STATES PATENT OFFICE 2,551,577

COUPLING

Cleophas P. Baum, Westgate, Md.

Application February 13, 1946, Serial No. 647,407

9 Claims. (Cl. 287—76)

(Granted under the act of March 3, 1883, as amended April 30, 1928; 370 O. G. 757)

This invention pertains to improvements in couplings and particularly to couplings for ropes, cables, rods, or the like.

In the use of flexible members such as ropes, cables, and rods, it is desirable to have a coupling which is not too cumbersome, is not too difficult to apply, and is effective. The present coupling embodies all of these features.

An object of this invention is to provide a coupling member which embodies the features enumerated above, and that cannot become disengaged or unlocked by accident or by impact from any direction.

Another object is to design a coupling member adapted to carry a load equal to the breaking strength of the rope or cable, has an overall diameter slightly in excess of the rope or cable, and permits rapid connection or disengagement.

Details of the invention are described in connection with the following drawings, in which Fig. 1 is a perspective view of the coupling barrel member with parts broken away;

Fig. 2 is a perspective view of an end fitting;

Fig. 3 shows a modified coupling with certain parts in section; and

Fig. 4 is a section on line 4—4 of Fig. 3.

The coupling member essentially consists of a barrel member 1 provided with internal threads at both ends. The threads at one end may be of the ordinary variety as shown at 2. Threads 3', however, at the opposite end, comprise an interrupted thread, as shown, for a purpose later described. It should be apparent, however, that spaced shoulder projections might be substituted for threads 3.

Internal threads 2 on one end of barrel member 1 engage corresponding threads 3 on terminal member 4. Terminal member 4 may be either swaged or poured on an end of rope or cable 6.

Terminal member 5 swaged on another section of rope or cable 6 is provided with coarse threads 7 corresponding to threads 3. Axial grooves 8 are machined in both threads 3 and 7 to permit insertion of terminal 5 axially into barrel member 1. After insertion, a relative rotation of a fraction of a revolution will cause threads 3' and 7 to become engaged. Grooves 8 may be of any desired width. It is preferred, however, that the threads and grooves be approximately equal in length, whereby the threads and grooves alternate. In the drawings, three axial grooves are used and spaced substantially at equal distances around the periphery of the barrel member 1 and terminal member 5. The machining operation removes a little more than fifty per cent of the thread due to a necessary slight clearance so that the thread on terminal member 5 can be conveniently inserted within grooves 8 in barrel member 1. Since three grooves are shown, about a one-sixth turn is required for engagement. However, a greater or less number of grooves can be used without departing from the scope of the invention.

In the preferred form of the invention, as shown in Fig. 1, spring-loaded lock member 10 is provided within barrel member 1. Lock member 10 is provided with grooves 13 corresponding to splines 9 on the end of terminal member 5. As previously stated, terminal member 5 is inserted into barrel member 1 and turned so that threads 3' and 7 are brought into engagement. Grooves 13 and splines 9 are so arranged that they become aligned when the threads are brought into engagement at a certain point. Spring 11 acting between lock member 10 and rib or bulkhead 12 urges grooves 13 and splines 9 into registering engagement, thereby preventing further rotation until the lock member is retracted from engaging position. This is done by inserting pin 14 into keeper 15 and applying a retracting force. Elongated slot 16 is provided in the barrel to permit retraction of lock member 10.

It will be apparent that insertion of terminal 5 into barrel 1 causes depression of spring 11. Upon rotation of terminal 5, splines 9 and grooves 13 become engaged, and lock member 10 springs back to complete the engagement. Further rotation is thereby prevented.

Instead of a spline and groove locking engagement, other forms of locking engagement may be used. Figs. 3 and 4 show terminal member 5' provided with ledge 18 engaging ledge 19 on locking member 20 upon rotation of terminal member 5' within barrel member 1'. The spring loading and retracting arrangements are similar to that shown in Fig. 1. Terminal 4' is of somewhat modified design, as shown, and is swaged onto the rope end.

The terminal member of Fig. 2 is provided with a projecting screw 21 to assist in aligning terminal member 5 for insertion in barrel 1. Screw 21 or an equivalent projecting pin is inserted into notch 22 which acts as a guide to assist in the insertion and rotation operation. The depth of notch 22 corresponds to the advance of the terminal during the partial turn required to register the lock and abut the terminal against the barrel. It will be observed that the cooperating threads 3' and 7 are left-hand, while the helical twist of cable 6 is right-hand. The purpose of this arrangement is to reduce the stress produced on the locking means 9, 10 as a result of extremely high tension stresses applied to the coupling. Failures of couplings of the interlocking type have previously been experienced because of fracture of the locking means when the coupling was used with twisted cable under high load stresses, because of the high torque developed by the tendency of the cable to untwist, or by the tendency of the threaded connection to unscrew, or by both acting in the same direction on the coupling. This danger of fracture of the locking means is reduced to a minimum by providing countertorques produced by the twisted cable and the threaded coupling connection by the selection of a left-hand thread for use with a right-hand twist, or vice versa. By thus counterbalancing the torques, the resultant torque stress on the locking means may be considerably reduced and under some load conditions even eliminated entirely.

The present coupling can be used wherever coupling of flexible members is required, such as in moorings, towing and hoisting equipment, and in the wire rope system of arresting gear.

The invention described herein may be manufactured and used by or for the Government of the United States of America for governmental purposes without the payment of any royalties thereon or therefor.

What is claimed is:

1. A coupling comprising a barrel member, a terminal member secured at one end of said barrel member, projecting shoulders spaced around the inside periphery of the other end of said barrel member, a second terminal member provided with corresponding spaced shoulders adapted to be inserted between said first-mentioned shoulders and to be engaged thereby upon partial rotation, automatic means for locking said second terminal member against further rotation in response to said partial rotation, manual quick release means for said locking means, and guide and stop means visible from the outside of said coupling indicating the relative rotational position between said barrel member and said second terminal member required for quick mutual insertion of said two sets of shoulders, and providing stop means for the two limits of said partial rotation.

2. A coupling comprising a barrel member, a terminal member secured to one end of said barrel member, interrupted threads spaced around the inside periphery of the opposite end of said barrel member, a second terminal member provided with corresponding interrupted threads adapted to be inserted between said first-mentioned interrupted threads and to be engaged thereby upon partial rotation, automatic means for locking said second terminal member against further rotation in response to said partial rotation, manual quick release means for said locking means, and guide and stop means visible from the outside of said coupling indicating the relative rotational position between said barrel member and said second terminal member required for quick mutual insertion of said two sets of threads, and providing stop means for the two limits of said partial rotation.

3. A coupling as defined in claim 2, wherein said guide and stop means comprise a cut out portion in the end of said barrel member and a projection on said second terminal member, cooperating with said cut out portion so as to be stopped against the ends of said cut out portion in the fully engaged and disengaged positions of said interrupted threads.

4. A coupling as defined in claim 2, wherein said locking means comprise an axially biased ratchet mounted in said barrel member, and a pawl on the end of said second terminal member for moving against said ratchet and snapping into locking engagement therewith upon said partial rotation.

5. A coupling as defined in claim 4, wherein said ratchet comprises an internally splined axially but non-rotatably slidable collar, a spring for biasing said collar outwardly of said barrel member, and said pawl being a correspondingly externally splined end on said second terminal member for fitting said internally splined collar when said threads are fully engaged.

6. A coupling as defined in claim 5, wherein said barrel member has an axial slot and said collar has a lug extending into said slot for restricting it against rotation and providing it with the limited axial sliding motion required for its operation between locked and unlocked position.

7. A coupling as defined in claim 6, wherein said lug is bored for the insertion of a pin to facilitate quick release of said locking means.

8. A cable coupling comprising a barrel structure, a twisted cable terminal member at one end of said barrel structure and having a cable end held rigidly therein, projecting helical shoulders spaced around the inside periphery of the other end of said barrel structure, a second twisted cable terminal member having another cable end held rigidly therein and provided with corresponding spaced helical shoulders adapted to be inserted between said first mentioned shoulders for coupling engagement therewith upon partial rotation, automatic pawl and ratchet locking means for holding said members in engagement against the reverse torque produced by reaction between said helical shoulders on the two members as a result of tension applied to said coupling, said cable ends being of the opposite hand from that of said helical shoulders, whereby to offset the stress imposed on said locking means as a result of said reverse torque by the tendency of said cable to untwist.

9. A cable coupling comprising the combination of claim 8, wherein said helical shoulders are left-hand and the cable ends are the ends of right-hand cables.

CLEOPHAS P. BAUM.

REFERENCES CITED

The following references are of record in the file of this patent:

UNITED STATES PATENTS

| Number | Name | Date |
| --- | --- | --- |
| 459,185 | Hindman | Sept. 8, 1891 |
| 1,372,238 | Kreiter | Mar. 22, 1921 |
| 1,438,751 | Des Isles | Dec. 12, 1922 |
| 1,645,428 | Hosmer et al. | Oct. 11, 1927 |
| 1,671,458 | Wilson | May 29, 1928 |
| 2,066,956 | Williams | Jan. 5, 1937 |
| 2,172,602 | Williams | Sept. 12, 1939 |